(12) United States Patent
Tsao

(10) Patent No.: US 8,779,334 B2
(45) Date of Patent: Jul. 15, 2014

(54) INTEGRATED APPARATUS ABLE TO CONDITION A DRY LOW-TEMPERATURE ENVIRONMENT IN A BAKING PROCESS

(75) Inventor: Min-Jen Tsao, Hsinchu (TW)

(73) Assignee: Ace Dragon Corp., Hsinchu (TW)

( * ) Notice: Subject to any disclaimer, the term of this patent is extended or adjusted under 35 U.S.C. 154(b) by 521 days.

(21) Appl. No.: 13/104,118

(22) Filed: May 10, 2011

(65) Prior Publication Data

US 2011/0271847 A1　Nov. 10, 2011

(30) Foreign Application Priority Data

May 10, 2010　(TW) ............................... 99208652 U

(51) Int. Cl.
*H05B 3/68* (2006.01)
(52) U.S. Cl.
USPC .................. 219/444.1; 219/390; 219/400
(58) Field of Classification Search
USPC ....................... 219/390, 400, 444.1
See application file for complete search history.

(56) References Cited

U.S. PATENT DOCUMENTS 5,377,298 A * 12/1994 Yang ............................. 392/360
2009/0013933 A1 * 1/2009 Lim et al. ...................... 118/728

* cited by examiner

*Primary Examiner* — John Wasaff
(74) *Attorney, Agent, or Firm* — Rosenberg, Klein & Lee

(57) ABSTRACT

An integrated apparatus able to condition a dry low-temperature environment in a baking process includes a baking unit, a drying unit, and at least a dry air introducing part. The baking unit has a heating unit to heat a first room at a baking period. The drying unit includes a dryer for dehumidifying a second room thereof at a dry low-temperature environment-conditioning period by providing the second room a dry low-temperature air. The dry air introducing part located between the first room and the second room is to separate the first room and the second room at the baking period, and to introduce the dry low-temperature air from the second room to the first room at the dry low-temperature environment-conditioning period.

19 Claims, 4 Drawing Sheets

INTEGRATED APPARATUS ABLE TO CONDITION A DRY LOW-TEMPERATURE ENVIRONMENT IN A BAKING PROCESS

This application claims the benefit of Taiwan Patent Application Serial No. 099208652, filed May 10, 2010, the subject matter of which is incorporated herein by reference.

BACKGROUND OF THE INVENTION (1) Field of the Invention

The invention relates to an environment-controlling apparatus, and more particularly to an integrated apparatus that can be used to bake an object in a manner of maintaining the environmental temperature at a dry and low-temperature surroundings after the baking period.

(2) Description of the Prior Art

With the nano technology, electronic parts can be manufactured precisely in a nanometer scale. On the other hand, with the manufacturing precision goes to the nanometer scales, the electronic parts are more vulnerable to the surrounding moisture. In some specific processes, existence of tiny moisture would affect dramatically the process yield. Actually, to the moisture sensitive devices (MSD), special specifications or standards upon the body moistures or environmental moistures of the production (for example, the J-STD-033B standard) have been made to the related raw materials, semi-finished goods and finished goods.

Currently, baking chambers are usually introduced to reduce the environmental moisture of production. However, the conventional baking chambers usually have the following shortcomings.

Firstly, after a baking process, body temperature of the object in the baking chamber as well as the environmental temperature inside the baking chamber are gradually lowered, such that the moisture inside and outside the chamber begins to condense to both the interior wall of the chamber and the surface of the object. Apparently, the water condensed to attach at the object would degrade the yield of the baking.

Secondly, to avoid the interior moisture to condense onto the object, the object is preferably removed away the baking chamber immediately to a dry low-temperature space, right after the baking process is complete. Such a move may increase the labor cost of the production.

Thirdly, after the baking, the action of removing the object from a high-temperature baking chamber to a low-temperature space may raise thermal shock damage to the object which undergoes a dramatic temperature drop within a short time.

It is obvious to the skilled person in the art that an improvement upon the baking apparatus as well as the baking process are needed urgently, and such that three foregoing problems in the current baking facilities can be better resolved.

SUMMARY OF THE INVENTION

Accordingly, it is the primary object of the present invention to provide an integrated apparatus able to condition a thy low-temperature environment in a baking process which can overcome the aforesaid three shortcomings of the conventional baking chamber so as to increase the yield of the baking process.

In the present invention, the integrated apparatus is able to condition a dry low-temperature environment in a baking process can comprise a baking unit, a drying unit, and at least a dry air introducing part.

The baking unit has thereinside a first room for accommodating an object to be baked and further includes a heating unit for heating the first room at a baking period of the baking process.

The drying unit has thereinside a second room and further includes a dryer for dehumidifying the second room at a dry low-temperature environment-conditioning period of the baking process by providing the second room a dry low-temperature air. In the present baking process, the dry low-temperature environment-conditioning period is performed right after the baking period.

The aforesaid at least a dry air introducing part is located between the first room and the second room. The dry air introducing part can separate the first room and the second room at the baking period, and can introduce the dry low-temperature air from the second room to the first room at the dry low-temperature environment-conditioning period.

In one embodiment of the present invention, the dry air introducing part of the integrated apparatus can further include a dry air valve and a dry air fan. The dry air valve poses a close state at the baking period to separate the first room and the second room, but poses an open state at the dry low-temperature environment-conditioning period to allow air-communication between the first room and the second room. The dry air fan located close to the dry air valve is to flow the dry low-temperature air from the second room to the first room at the dry low-temperature environment-conditioning period.

In one embodiment of the present invention, the baking unit of the integrated apparatus can further have a feedback air guiding part. The feedback air guiding part further includes a feedback air valve and a feedback air fan. The feedback air valve poses a close state at the baking period so as to separate the first room and the second room, but poses an open state at the dry low-temperature environment-conditioning period so as to allow air-communication between the first room and the second room. The feedback air fan located close to the feedback air valve is to flow a work air inside the first room to the second room at the dry low-temperature environment-conditioning period.

In one embodiment of the present invention, the baking unit of the integrated apparatus can further include a hot air guiding part having a hot air fan for generating a hot airflow to heat the first room. In particular, the baking unit further has thereinside a hot airflow passage and a spacer plate. Both the heating unit and the hot air guiding part are mounted inside the hot airflow passage. The spacer plate is to control separation and communication between the hot airflow passage and the first room.

In one embodiment of the present invention, the baking unit of the integrated apparatus may further have a temperature sensor located inside the first room for monitoring a temperature of the first room.

In one embodiment of the present invention, the baking unit of the integrated apparatus can further include an inlet valve and an outlet valve. The inlet valve located between the first room and an exterior space is to allow an exterior air to flow therethrough into the first room as an inlet airflow at the baking period. The outlet valve located between the first room and the exterior space is to allow a work air of the first room to leave therethrough the first room to the exterior space as an outlet airflow at the baking period. In the present invention, either the inlet valve or the outlet valve can be one of a temperature-influenced memory alloy valve, a solenoid valve or a motor-driven valve.

In one embodiment of the present invention, the drying unit of the integrated apparatus can further include a nitrogen valve which is open at the dry low-temperature environment-conditioning period so as to flow a nitrogen airflow into the second room.

In one embodiment of the present invention, the drying unit of the integrated apparatus can further include a relative humidity sensor and an oxygen concentration sensor respectively for monitoring a relative humidity and an oxygen concentration of the second room, respectively.

In one embodiment of the present invention, the integrated apparatus can further include a control unit which is electrically connected with the heating unit and the drying unit, respectively for controlling the heating unit to heat the first room at the baking period and for controlling the drying unit to dehumidify the second room at the dry low-temperature environment-conditioning period.

Preferably, in the present invention, the dry low-temperature air would have a temperature ranged between 0° C. and 40° C., that is similar to ambient or room temperature.

All these objects are achieved by the integrated apparatus able to condition a dry low-temperature environment in a baking process described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an integrated apparatus able to condition a dry low-temperature environment in a baking process. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the integrated apparatus able to condition a dry low-temperature environment in a baking process can be applied to the baking process of various objects. These objects include raw materials, semi-finished goods and finished goods.

Figure 1:
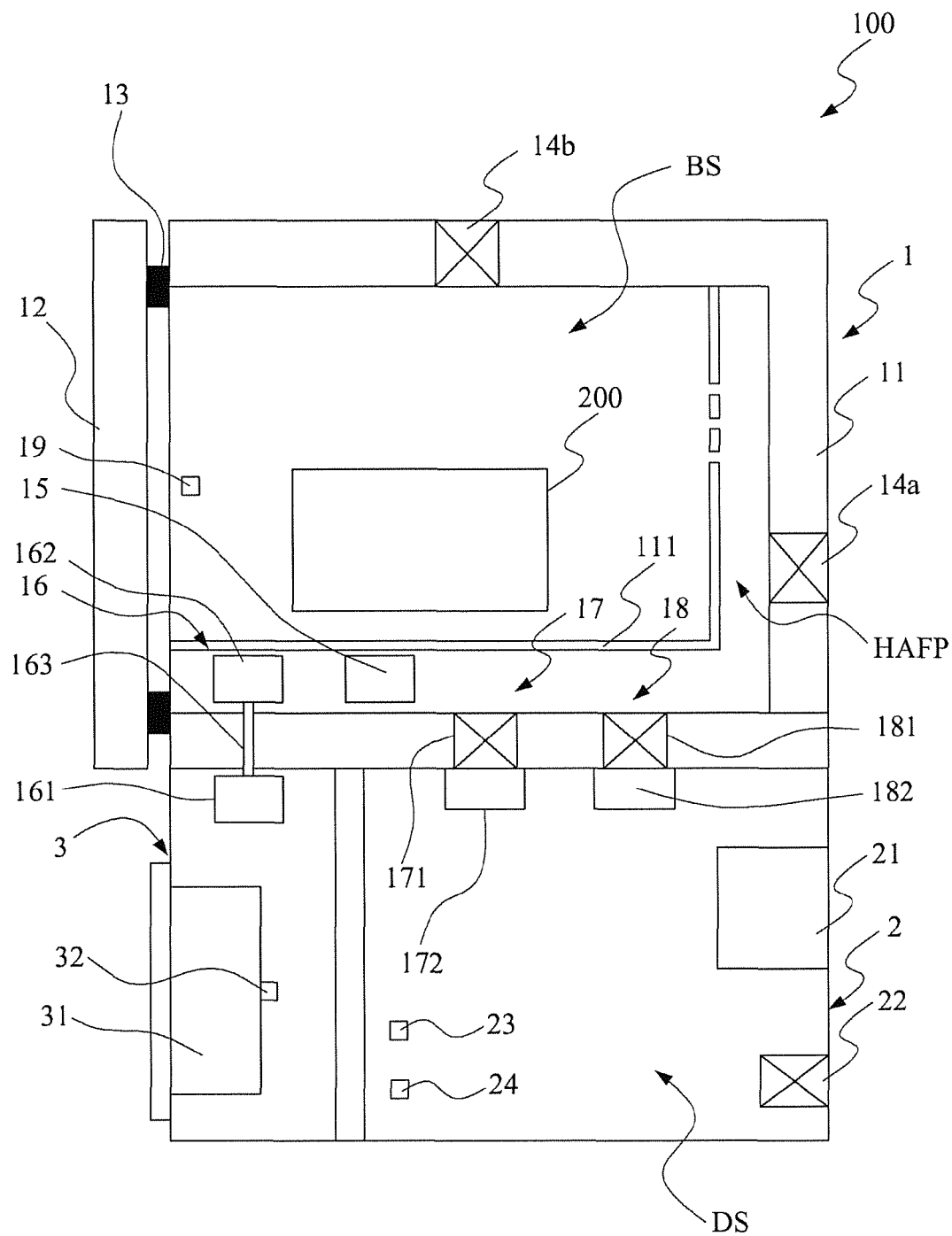
FIG. 1 shows schematically a view of a preferable embodiment of the integrated apparatus able to condition a dry low-temperature environment in a baking process in accordance with the present invention.

Referring now to FIG. 1, a preferred integrated apparatus able to condition a dry low-temperature environment in a baking process according to the present invention is schematically shown. The integrated apparatus 100 includes a baking unit 1, a drying unit 2 and a control room 3. The baking unit 1 further includes a casing 11, a door 12, a heat-insulation seal element 13, an inlet valve 14a, an outlet valve 14b, a heating unit 15, a hot air guiding part 16, a dry air guiding part 17, a feedback air guiding part 18 and a temperature sensor 19.

The casing 11 further includes a spacer plate 111 to divide the interior space of the baking unit 1 into a first room BS and a hot airflow passage HAFP. It is noted that, in the present invention, the first room BS and the hot airflow passage HAFP are maintained in an air-communication relation by a plurality of through holes. The first room BS is to accommodate an object 200 to be baked. As mentioned above, the object 200 can be any of raw materials, semi-finished goods and finished goods.

The door 12 is to seal the casing 11 with the help of the heat-insulation seal element 13. While the door 12 is in an open state, the object 200 can be moved to or removed away from the first room BS. The inlet valve 14a and the outlet valve 14b, both constructed between the first room BS and an exterior space, can be temperature-influenced memory alloy valves, solenoid valves or motor-driven valves. Preferably, both of the valves 14a and 14b are temperature-influenced memory alloy valves.

The heating unit 15 located inside the hot airflow passage HAFP can be an electric heating device. The hot air guiding part 16 can include a motor 161, a hot air fan 162 and a power-transmission unit 163. The motor 161 is located inside the control room 3, the hot air fan 162 is located inside the hot airflow passage HAFP, and the power-transmission unit 163 is to transmit power from the motor 161 to the hot air fan 162.

The dry air guiding part 17 located between the first room BS and the second room DS inside the drying unit 2 can further include a dry air valve 171 and a dry air fan 172. The dry air valve 171 is constructed between the first room BS and the second room DS, and the dry air fan 172 is located close to the dry air valve 171.

The feedback air guiding part 18 located between the first room BS and the second room DS can further include 1 feedback air valve 181 and a feedback air fan 182. The feedback air valve 181 is constructed between the first room BS and the second room DS, and the feedback air fan 182 is constructed close to the feedback air valve 181.

The temperature sensor 19 is located inside the first room BS.

The drying unit 2 includes a dryer 21, a nitrogen valve 22, a relative humidity sensor 23 and a oxygen concentration sensor 24. The dryer 21 is to dehumidify the second room DS. The nitrogen valve 22 connects the second room DS to an exterior nitrogen source (not shown in the figure). The relative humidity sensor 23 and the oxygen concentration sensor 24 are to monitor relative humidity and oxygen concentration inside the second room DS, respectively.

The control room 3 includes a control unit 31 and a current sensor 32. The control unit 31 is electrically connected with the heating unit 15, the motor 16, the dry air guiding part 17, the feedback air guiding part 18, the temperature sensor 19, the dryer 21, the nitrogen valve 22, the relative humidity sensor 23, the oxygen concentration sensor 24 and the current sensor 32. In the case that both the inlet valve 14a and the outlet valve 14b are solenoid valves or motor-driven valves, the control unit 31 needs to connect with these two valves 14a and 14b. The current sensor 32 is used to detect the work current of the integrated apparatus 100.

Figure 2:
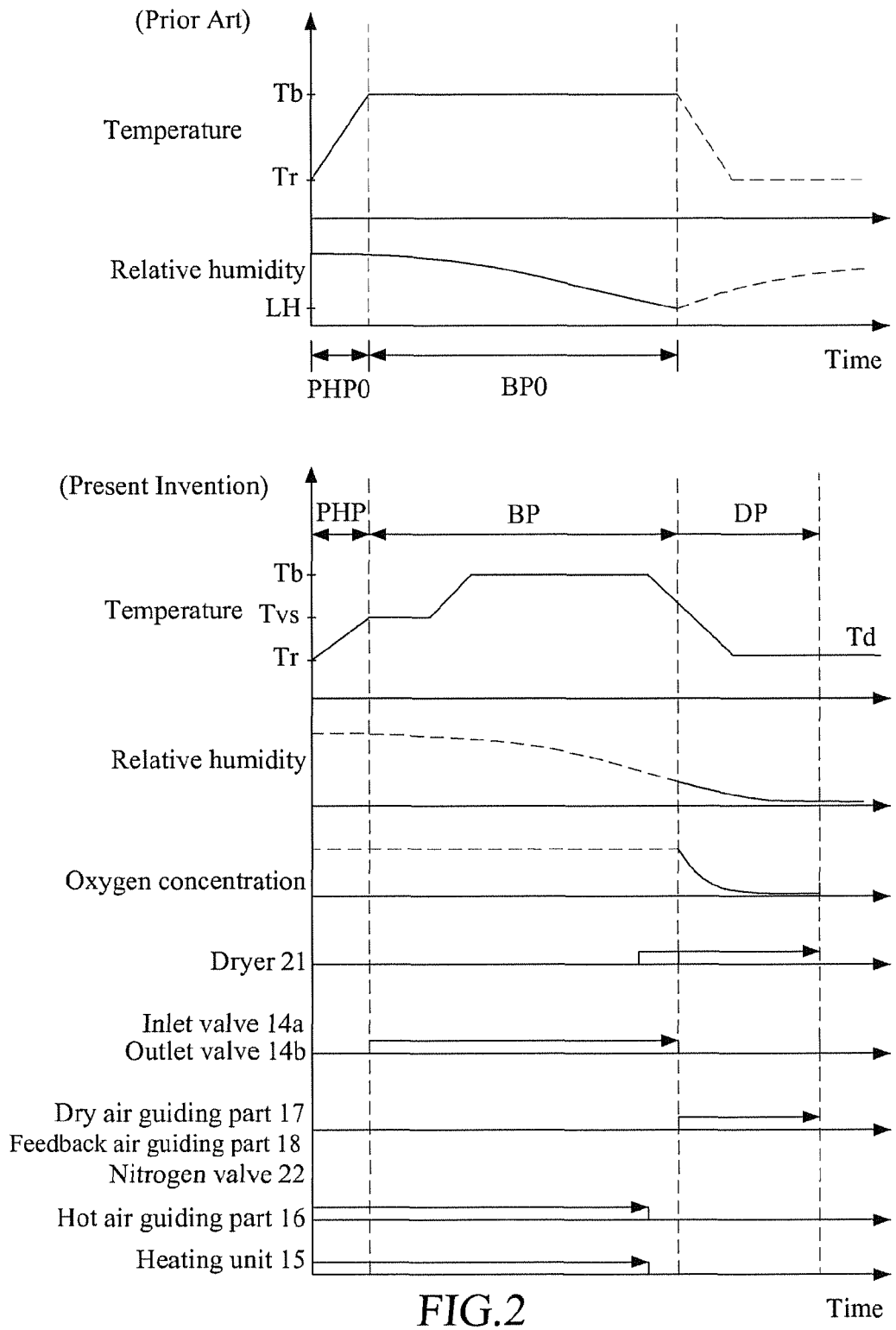
FIG. 2 illustrates two time flows, in which one is related to temperatures and relative humidity control within a baking process of the prior art, the other is related to work status, temperatures, relative humidity and oxygen concentration within a baking process that utilizes the integrated apparatus of FIG. 1 in accordance with the present invention.

Referring now to FIG. 2, a time flow of work status, temperatures, relative humidity and oxygen concentration within a baking process that utilizes the integrated apparatus of present invention shown in FIG. 1 is illustrated; and in additional, another time flow of work status, temperatures, relative humidity of the prior art is also illustrated.

In the prior, a conventional baking process is executed in an inner chamber, where an object is accommodated therein, of an oven, so that the conventional baking process only includes a preheat period (PHP0) and a baking period (BP0). During the PHP0, a heater is applied to heat the chamber to rise the temperature within chamber from a room temperature Tr to a baking temperature Tb, and the relative humidity within the chamber is gradually lowered till it enters to the BP0. During the BP0, the temperature within chamber keeps in the baking temperature Tb, and the relative humidity within the chamber is gradually lowered to a lowest relatively humidity LH. After the BP0, the heater stops heating the chamber to make the temperature within the chamber be gradually lowered, and make the relative humidity within the chamber be gradually risen at the same period, such that the moisture inside and outside the chamber begins to condense to both the interior wall of the chamber and the surface of the object. Obviously, the conventional baking process cannot provide a preferable environment with both low temperature and dry conditions for the object after the BP0.

Comparing with the prior art, please referred to both FIG. 1 and FIG. 2, in which a baking process of the present invention can include a preheat period (PHP), a baking period (BP) and a dry low-temperature environment-conditioning period (DP). In the PHP, the control unit 31 would control the heating unit 15 to heat up and the motor 161 (going with the heating unit 15) to drive the hot air fan 162 to generate a hot airflow HAF (referred to FIG. 3). The hot airflow HAF would flow along the hot airflow passage HAFP to the first room BS and thus to heat up the first room BS. Thereby, the temperature of the first room BS would rise gradually from a room temperature Tr to a valve switch temperature Tvs. As soon as the temperature of the first room BS reaches the valve switch temperature Tvs, the BP begins.

Figure 3:
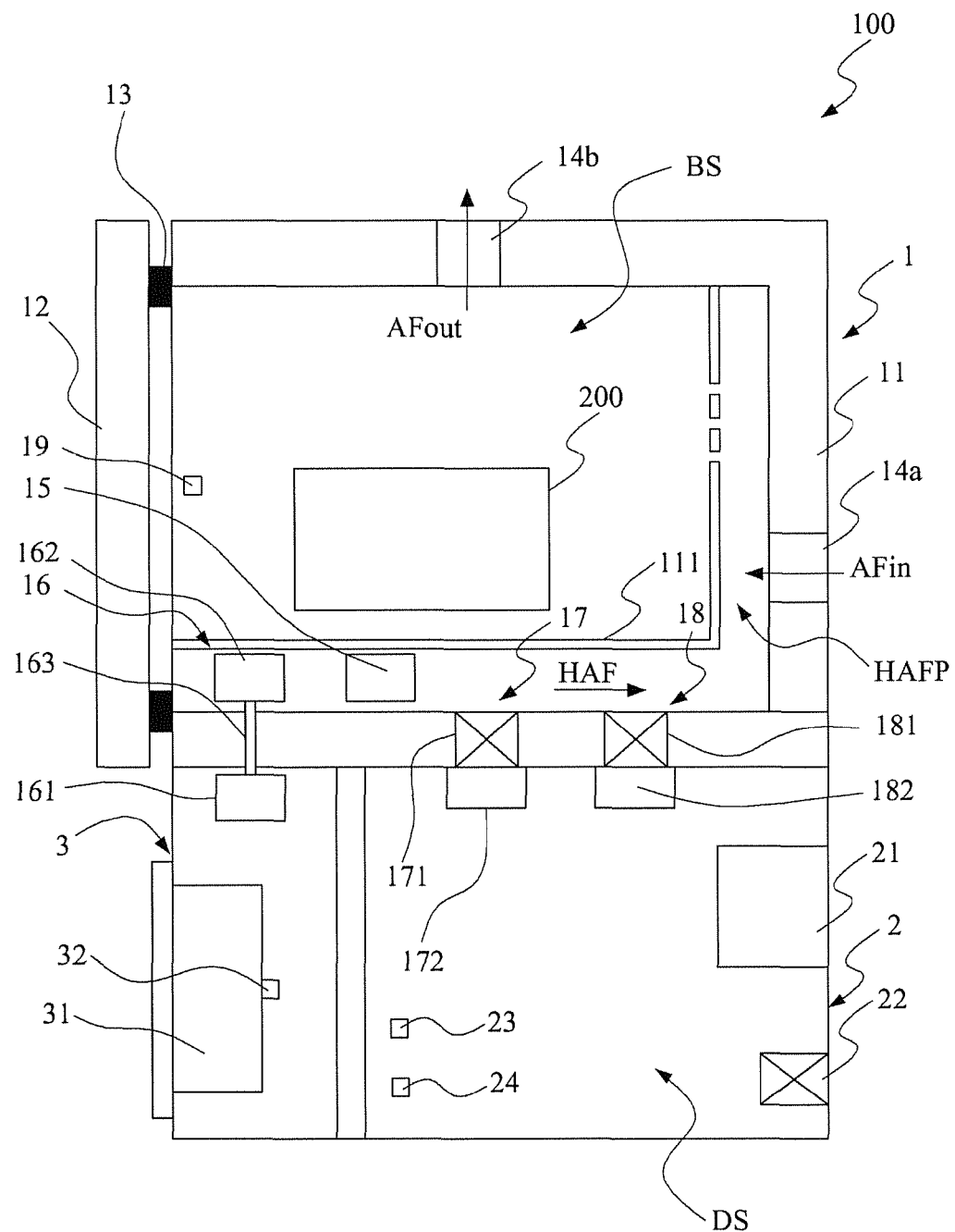
FIG. 3 shows a working state (baking period) of the integrated apparatus of FIG. 1.

Referring now to FIG. 3, a working state (baking period) of the integrated apparatus 100 is shown. In this embodiment, the inlet valve 14a and the outlet valve 14b are both the temperature memory alloy valves with the same Valve switch temperature Tvs. Referred also to FIG. 2, in the BP, the inlet valve 14a and the outlet valve 14b would open automatically. (Note: if both of valves 14a and 14b are solenoid valves or motor-driven valves, both of the valves 14a and 14b are opened by the control unit 31.) After the valves 14a and 14b are opened, an exterior air (not shown in the figure) can be introduced into the first room BS as an inlet airflow AFin. As the AFin is entering the first room BS, a work air (not shown in the figure) originally inside the first room BS would be expelled out of the first room BS as an exhausted airflow AFout.

At this current stage, the temperature of the first room BS will rise gradually till a baking temperature Tb is reached. The dry air valve 171 of the dry air guiding part 17 and the feedback air valve 181 of the feedback air guiding part 18, and the nitrogen valve 22 are all posed at the close states. The dry air fan 172 and the feedback air fan 182 are both at the stop states. At this time, the first room BS is isolated from the second room DS.

At the end of the BP, the control unit 32 would control the heating unit 15 and the motor 161 to stop operations. Thereby, the HAF would fade down so as to lower gradually the temperature of the first room BS. When the temperature of the first room BS drops to the Valve switch temperature Tvs, the inlet valve 14a and the outlet valve 14b would close automatically or be closed by the control unit 32. Then, the dry low-temperature environment-conditioning period DP will begin.

Figure 4:
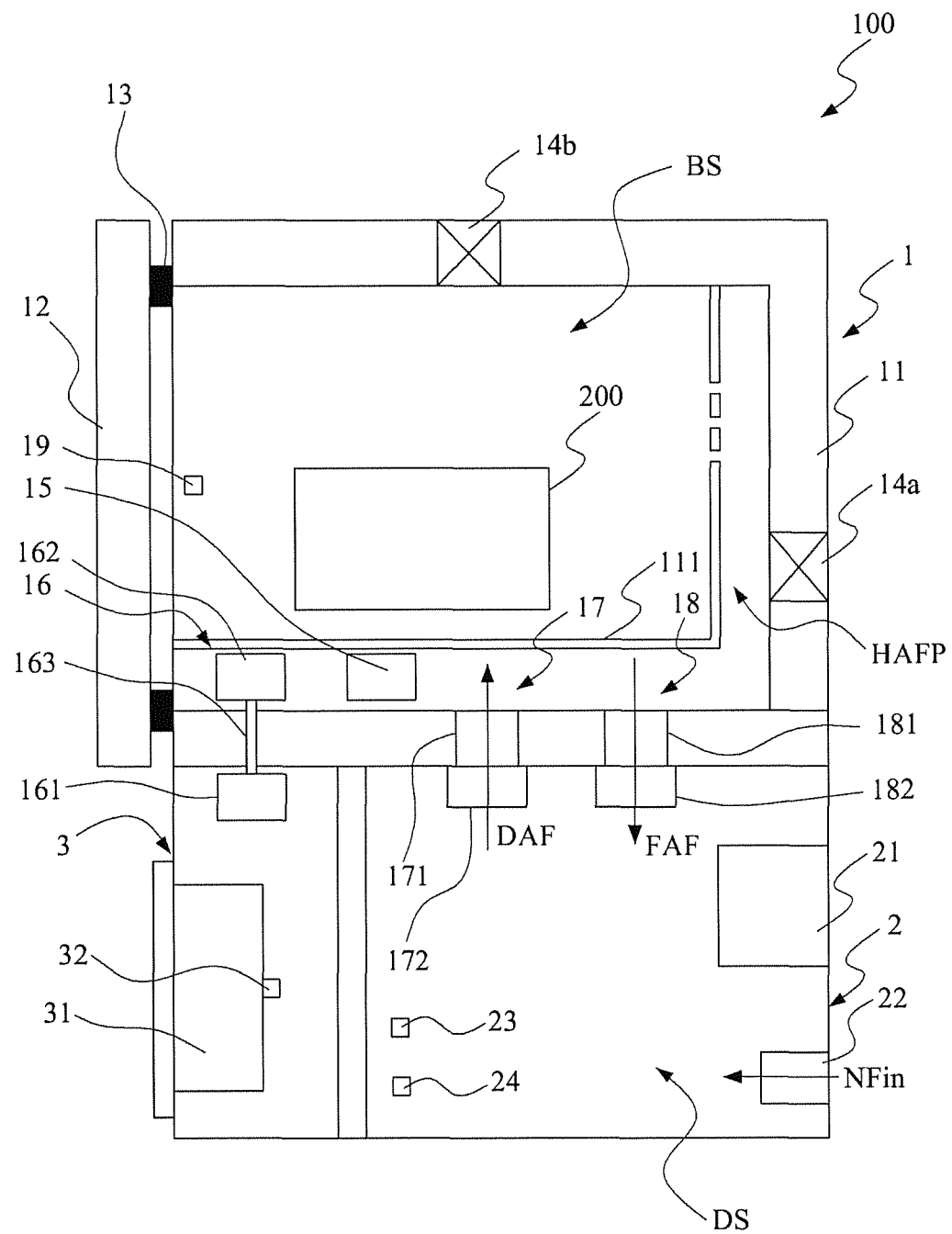
FIG. 4 shows another state (dry low-temperature environment-conditioning period, DP) of the integrated apparatus of FIG. 1.

Referring now to FIG. 4, the next working state (dry low-temperature environment-conditioning period, DP) of the integrated apparatus 100 is shown. Referred also to FIG. 2, in the DP, the control unit 32 would control the dryer 21 to start. (In the present invention, in order to lower the humidity of the second room DS prior to the DP, the control unit 31 can start the dryer in advance at the end stage of the BP, such that a drier air can exist in the second room DS.)

In the DP, the control unit 31 would control the dry air guiding part 17 and the feedback air guiding part 18 to open the dry air valve 171 and the feedback air valve 181, respectively. Therefore, at this stage, the first room BS is air-communication with the second room DS. Then, the dry air fan 172 and the feedback air fan 182 would be started by the control unit 31 so as to pump the dry air in the second room DS to the first room BS as the dry airflow DAF, and to pump the work air in the first room BS to the second room DS as a feedback airflow FAF. Upon such an arrangement, the DAF would form a dry low-temperature environment to the first room BS. At this time, the temperature of the environment is defined as a dry temperature Td.

Importantly, in the present invention, the DAF and the FAF form integrally a close-loop circulation in the integrated apparatus 100. Thereby, after a substantial time of operation, the first room BS and the second room DS would have the same (or at least close) environment temperature, humidity and oxygen concentration. In the present invention, the temperature, relative humidity and oxygen concentration of the dry low-temperature environment can be obtained from the temperature sensor 19, the relative humidity sensor 23 and the oxygen concentration sensor 24, respectively.

In addition, if the object 200 in the first room BS needs to have an anti-oxidation feature, it can be achieved by the control unit 31 controlling the nitrogen valve 22 to open and to introduce a nitrogen flow NFin into the DP. Upon such an arrangement, the nitrogen can be added to the close-loop circulation, and thus the oxygen concentration in the circulation can be lowered. As a result, the object 200 may present an anti-oxidation feature.

Finally, it should be cleared in the present invention that the Td is a temperature lower than the baking temperature of the object 200. Preferably, the dry temperature Td could be a temperature ranged between 0° C. and 40° C., that is similar to the ambient or room temperature; and the valve switch temperature Tvs could be 45° C., and the baking temperature could be a temperature ranged between 50° C. and 300° C. Certainly, in some other application, all these temperatures are subjected to change according to various application situations.

By integrating the baking unit 1, the drying unit 2 and the dry air guiding unit 17 into a unique apparatus according to the present invention, the dry air in the second room DB, which is utilized further to maintain the dry low-temperature environment in the first room BS, can be supplied to the first room BS (the baking chamber) that accommodates the object 200 to be baked. Upon such an arrangement, the aforesaid shortcomings in additional labor cost, lower yield due to water condensation, and the thermal shock damage to the conventional baking process can thus be successfully improved.

While the present invention has been particularly shown and described with reference to a preferred embodiment, it will be understood by those skilled in the art that various changes in form and detail may be without departing from the spirit and scope of the present invention.

I claim:

1. An integrated apparatus able to condition a dry low-temperature environment in a baking process, comprising:
   a baking unit, having thereinside a first room for accommodating an object, further including a heating unit for heating the first room at a baking period;
   a drying unit, having thereinside a second room, further including a dryer for dehumidifying the second room at a dry low-temperature environment-conditioning period, after the baking period, by providing the second room a dry low-temperature air; and
   at least a dry air introducing part, located between the first room and the second room, separating the first room and the second room at the baking period, introducing the dry low-temperature air from the second room to the first room at the dry low-temperature environment-conditioning period;
   wherein said dry air introducing part further includes:
   a dry air valve, posing a close state at said baking period to separate said first room and said second room, posing an open state at said dry low-temperature environment-conditioning period to allow air-communication between said first room and said second room; and
   a dry air fan, located close to the dry air valve, flowing said dry low-temperature air from said second room to said first room at said dry low-temperature environment-conditioning period.

2. The integrated apparatus according to claim 1, wherein said baking unit further has a feedback air guiding part, the feedback air guiding part further including:
   a feedback air valve, posing a close state at said baking period to separate said first room and said second room, posing an open state at said dry low-temperature environment-conditioning period to allow air-communication between said first room and said second room; and
   a feedback air fan, located close to the feedback air valve, flowing a work air inside said first room to said second room at said dry low-temperature environment-conditioning period.

3. The integrated apparatus according to claim 1, wherein said baking unit further includes a hot air guiding part having a hot air fan, the hot air fan for generating a hot airflow to heat said first room.

4. The integrated apparatus according to claim 3, wherein said baking unit further has thereinside a hot airflow passage and a spacer plate, said heating unit and said hot air guiding part been mounted inside the hot airflow passage, the spacer plate being to control separation and communication of the hot airflow passage and said first room.

5. The integrated apparatus according to claim 1, wherein said baking unit further has a temperature sensor located inside said first for monitoring a temperature of said first room.

6. The integrated apparatus according to claim 1, wherein said baking unit further includes:
   an inlet valve, located between said first room and an exterior space, allowing an exterior air to flow therethrough into said first room as an inlet airflow at said baking period; and
   an outlet valve, located between said first room and the exterior space, allowing a work air to leave therethrough said first room to the exterior space as an outlet airflow at said baking period.

7. The integrated apparatus according to claim 6, wherein said inlet valve is one of a temperature-influenced memory alloy valve, a solenoid valve and a motor-driven valve, and said outlet valve is also one of a temperature-influenced memory alloy valve, a solenoid valve and a motor-driven valve.

8. The integrated apparatus according to claim 1, wherein said drying unit further includes a nitrogen valve which is open at said dry low-temperature environment-conditioning period to flow a nitrogen airflow into said second room.

9. The integrated apparatus according to claim 1, wherein said drying unit further includes a relative humidity sensor and an oxygen concentration sensor for monitoring a relative humidity and an oxygen concentration of said second room, respectively.

10. The integrated apparatus according to claim 1, further including a control unit electrically connected with said heating unit and said drying unit, respectively for controlling said heating unit to heat said first room at said baking period and for controlling said drying unit to dehumidify said second room at said dry low-temperature environment-conditioning period.

11. The integrated apparatus according to claim 1, wherein said dry low-temperature air has a temperature ranged between 0° C. and 40° C.

12. An integrated apparatus able to condition a dry low-temperature environment in a baking process, comprising:
   a baking unit, having thereinside a first room for accommodating an object, further including a heating unit for heating the first room at a baking period;
   a drying unit, having thereinside a second room, further including a dryer for dehumidifying the second room at a dry low-temperature environment-conditioning period, after the baking period, by providing the second room a dry low-temperature air; and
   at least a dry air introducing part, located between the first room and the second room, separating the first room and the second room at the baking period, introducing the dry low-temperature air from the second room to the first room at the dry low-temperature environment-conditioning period;
   wherein said baking unit further includes a hot air guiding part having a hot air fan, the hot air fan for generating a hot airflow to heat said first room; and
   a hot airflow passage and a spacer plate, said heating unit and said hot air guiding part been mounted inside the hot airflow passage, the spacer plate being to control separation and communication of the hot airflow passage and said first room.

13. The integrated apparatus according to claim 12, wherein said baking unit further includes a hot air guiding part having a hot air fan, the hot air fan for generating a hot airflow to heat said first room.

14. The integrated apparatus according to claim 12, wherein said baking unit further has a temperature sensor located inside said first for monitoring a temperature of said first room.

15. The integrated apparatus according to claim 12, wherein said baking unit further includes:
   an inlet valve, located between said first room and an exterior space, allowing an exterior air to flow therethrough into said first room as an inlet airflow at said baking period; and
   an outlet valve, located between said first room and the exterior space, allowing a work air to leave therethrough said first room to the exterior space as an outlet airflow at said baking period.

16. An integrated apparatus able to condition a dry low-temperature environment in a baking process, comprising:
- a baking unit, having thereinside a first room for accommodating an object, further including a heating unit for heating the first room at a baking period;
- a drying unit, having thereinside a second room, further including a dryer for dehumidifying the second room at a dry low-temperature environment-conditioning period, after the baking period, by providing the second room a dry low-temperature air; and
- at least a dry air introducing part, located between the first room and the second room, separating the first room and the second room at the baking period, introducing the dry low-temperature air from the second room to the first room at the dry low-temperature environment-conditioning period;

wherein said baking unit further includes:
- an inlet valve, located between said first room and an exterior space, allowing an exterior air to flow therethrough into said first room as an inlet airflow at said baking period; and
- an outlet valve, located between said first room and the exterior space, allowing a work air to leave therethrough said first room to the exterior space as an outlet airflow at said baking period.

17. The integrated apparatus according to claim 16, wherein said baking unit further includes a hot air guiding part having a hot air fan, the hot air fan for generating a hot airflow to heat said first room.

18. The integrated apparatus according to claim 16, wherein said baking unit further has a temperature sensor located inside said first for monitoring a temperature of said first room.

19. The integrated apparatus according to claim 16, wherein said inlet valve is one of a temperature-influenced memory alloy valve, a solenoid valve and a motor-driven valve, and said outlet valve is also one of a temperature-influenced memory alloy valve, a solenoid valve and a motor-driven valve.

* * * * *